Nov. 12, 1963   W. S. HAYWARD, JR   3,110,772
ELECTRICAL SWITCHING ARRAY
Filed June 28, 1962
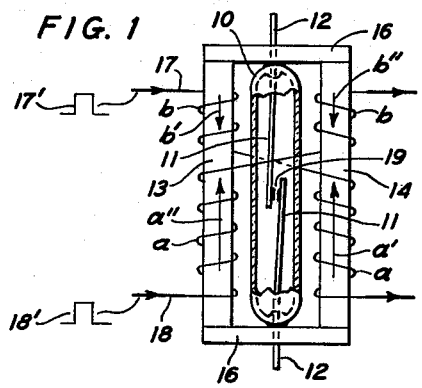
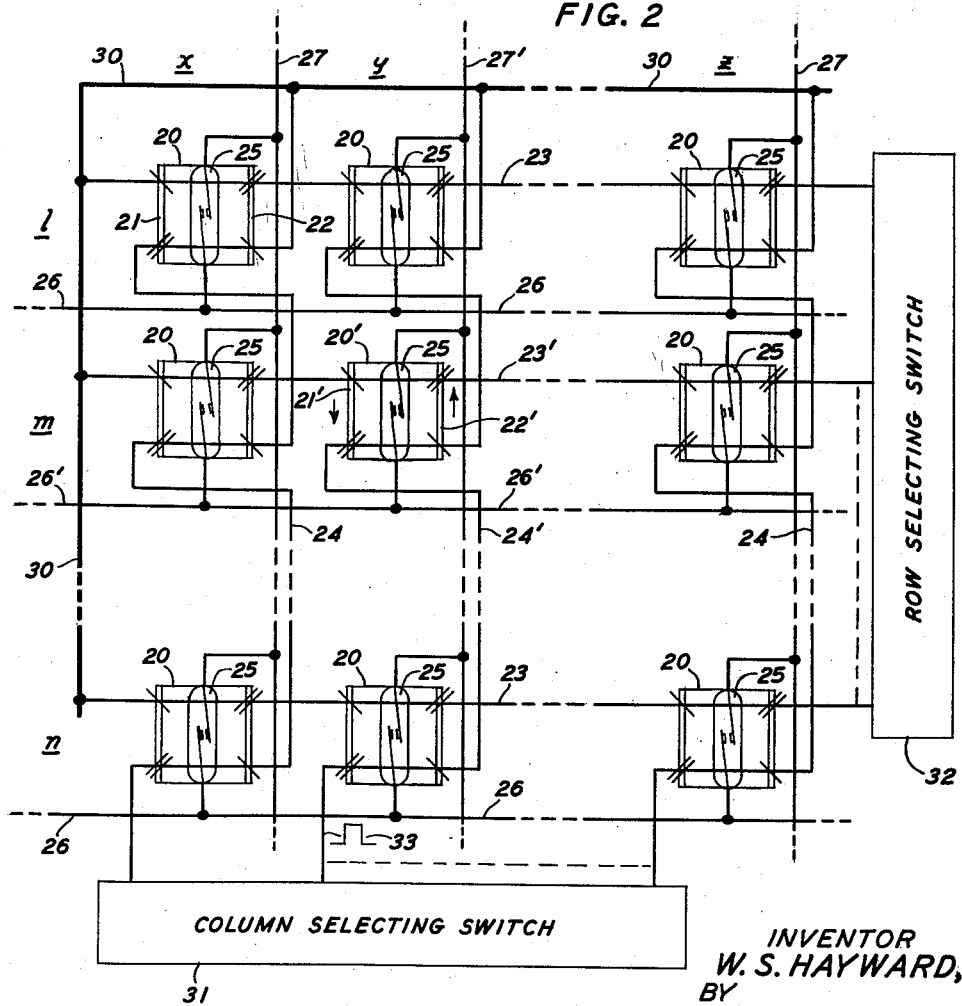
INVENTOR
W. S. HAYWARD, JR.
BY
William H. Kamstra
ATTORNEY

United States Patent Office 3,110,772
Patented Nov. 12, 1963

3,110,772
ELECTRICAL SWITCHING ARRAY
Walter S. Hayward, Jr., Westfield, N.J., assignor to Bell Telephone Laboratories, Incorporated, New York, N.Y., a corporation of New York
Filed June 28, 1962, Ser. No. 206,055
7 Claims. (Cl. 179—18)

This invention relates to electrical switching systems, and more particularly to electrical switches arranged to present a coordinate array of crosspoints.

In the copending application of T. N. Lowry, Serial No. 847,918, filed October 22, 1959, now Patent 3,037,085, May 29, 1962, a coordinate array switching matrix is described in which each of the individual relays, named ferreeds, comprises a pair of electrical contacting reeds operable responsive to a magnetic flux therethrough. The contacting reeds, which in circuit applications are included in the electrical transmission path to be controlled, are magnetically connected at each end to a pair of magnetic members each of a material exhibiting substantially rectangular hysteresis characteristics. This structure presents three closed flux loops: Two of the loops including, respectively, the magnetic members and sharing the flux return path presented by the contacting reeds, and the other loop including both magnetic members and bypassing the contacting reeds. The operation of the contacting reeds is controlled by controlling the orientation of magnetic flux in the magnetic members. When a flux is oriented in both of the members in the same direction, closure of the flux will be through the common return path presented by the contacting reeds whereupon the relay is closed. When the direction of flux is reversed in either one of the members, the flux in one member will be closed through the other with the result that the contacting reeds are bypassed and the relay opened. In either the closed or the open condition, the relay is maintained in its operative state by the remanent flux in the magnetic members.

Flux orientation control in the magnetic members and thereby the flux through the contacting reeds is had by means of a pair of energizing windings inductively coupled to each of the members. Each member has a first and a second winding coupled thereto, a first winding of each member having a greater number of turns than the second winding. Further, the first winding of each member is connected in series opposition to the second winding of the other member. The corresponding windings of the members are also coupled so that, when energized, magnetic drives are applied to the members in the same direction. With this winding arrangement, when both of the series connected winding pairs are simultaneously energized, the opposing magnetomotive forces generated in the windings with respect to each member are algebraically added. The magnetomotive forces generated by the first members in each case predominate and both members are driven to the same direction of remanent magnetization. As mentioned in the foregoing, the closure of flux from each of the members in this case returns through the common return path presented by the contacting reeds resulting in the closing of the relay.

On the other hand, when either one but not both of the series connected winding pair sets is energized, as a result of the winding directions, the flux in the magnetic members is oppositely directed, and its closure bypasses the contacting reeds thereby causing them to open. As described in the aforementioned copending application, relays of this character are advantageously adapted for arrangement in a coordinate array. In such an array, corresponding ones of the winding pair sets of each of the relays are serially connected in a row and column energizing circuits. In order to close a selected crosspoint relay, coincident current pulses are applied to the row and column energizing circuits defining the selected crosspoint. In this manner both winding pair sets of the relay at the selected crosspoint are simultaneously energized to effect contact closure. Each of the nonselected relays appearing in the row and column defining the selected relay, however, will have only one of its serially connected winding pair sets energized. As a result, and in accordance with the principles of operation of this class of relays, each of these nonselected relays will be opened if it previously had been in a closed state. The energization of the class of ferreed relays described in the foregoing is termed "differential excitation."

It is apparent from the foregoing operational aspects of a differentially excited ferreed switching matrix that somewhat critical requirements are imposed on the timing and waveforms of the controlling current pulses. Should the two current pulses applied to select a crosspoint be sufficiently separated in time, for example, instead of closing the selected relay, it will be left open. If the selected relay were in fact previously closed and its continued closure desired, current pulses, which at the trailing edges, are not properly coincident will only cause the relay to open. Current pulses of simple waveform which precisely coincide in time are thus required to insure the discriminating closure of a selected crosspoint relay in the array. When such pulses are simple sinusoidal waveforms, the frequency must be closely regulated so that the trailing edges coincide. To achieve the required current pulses, it is evident that severe limitations may be imposed on the pulse sources controlling the selecting of a crosspoint relay.

It is an object of this invention to insure the absolute coincidence of current pulses in a differentially excited ferreed switching matrix and to remove the relative amplitude margins of these current pulses.

Another object of this invention is to simplify the fabrication of a ferreed switching matrix.

A further object of this invention is to provide a new and novel switching matrix employing flux responsive reed contacting members.

The foregoing and other objects of this invention are realized in one specific embodiment thereof comprising a coordinately arranged plurality of ferreed relay devices each of which is advantageously of the character described in the foregoing and, in more detail, in the aforementioned copending application of T. N. Lowry. The corresponding serially connected winding pair sets of the individual relays are further serially connected in a plurality of row and column energizing circuits. The row and column energizing circuits thus define at their intersections a coordinate array of crosspoints in the conventional manner. The contacting reeds of the ferreeds at each crosspoint provide bridges between a second plurality of coordinately arranged electrical conductors which may comprise transmission paths of the circuits to be controlled. The ferreed relays thus provide means for connecting any one of the column electrical conductors to any one of the row conductors.

Each of the column energizing circuits is connected at one end to a suitable selecting switch for selectively providing current pulses to the ferreed devices to cause closure of the contacting reeds. Each of the row energizing circuits is connected at one end to a second selecting switch capable of selectively providing a ground or other difference potential to the latter energizing circuits. The other end of each of the row and column energizing circuits is connected to a common conducting bus. A continuous electrical conducting path is thus presented through any one of the row energizing circuits and any one of the column energizing circuits. More specifically, according to the principles of this invention, all of the energizing windings of a selected ferreed relay are serially connected together via the coordinate energizing circuits and the common conducting bus. A continuous closed conducting path is thus available from the input end of any column energizing circuit to the output end of any row energizing circuit. Included in each of the conducting paths are the two sets of energizing windings of the ferreed relay defined at the intersection of the energizing circuits.

Advantageously, this invention makes possible the removal of substantially all of the restrictions on the operating current pulses. Virtually any waveform is thus made acceptable, only a minimum limit being imposed which is determined as sufficient to cause a flux reversal in a magnetic member of the ferreed relay. Absolute time coincident follows from the serial connection of the energizing windings of a selected crosspoint relay. As a result, no matter what the waveform of an applied current pulse, the necessary amplitude to operate a selected relay appears in both of the serially connected winding sets of the relay at precisely the same time. Obviously, the access circuitry of the ferreed switching matrix is substantially simplified with an attendant reduction in cost.

Accordingly, an important feature of this invention is a common conducting bus electrically connecting one end of each of the column energizing circuits with one end of each of the row energizing circuits of a differentially excited ferreed switching matrix.

The foregoing feature makes possible a second feature of this invention in that coincidently energized windings of a selected ferreed relay of a switching matrix are directly serially connected to achieve absolute time coincidence of applied energizing current pulses.

The foregoing and other objects and features of this invention will be better understood from a consideration of the detailed description of one specific embodiment thereof which follows when taken in conjunction with the accompanying drawing in which:

FIG. 1 is a simplified presentation of a differentially excited ferreed switching device which is advantageously adapted for use with the present invention; and FIG. 2 is a schematic presentation of a coordinate array ferreed switching matrix according to the principles of this invention.

A brief description of a differentially excited ferreed switching device comprising a subcombination of the switching matrix of this invention will serve to demonstrate the problems to which this invention is directed and the advantageous manner in which these problems are overcome. A simple ferreed switching device illustrating its principles of operation is shown in FIG. 1 and comprises a pair of contacting reeds 11 which may be enclosed in a glass envelope 10. The reeds 11, which terminate in terminals 12, are of an electrically conducting magnetically permeable material such that when a magnetic flux is closed therethrough, contacts 19 on the overlapping faces of the reeds 11 are closed. An electrical circuit, which in an actual use of the device of FIG. 1 is connected to the terminals 12, may thus be controlled. The terminals 12 are passed through apertures in, or are otherwise in magnetic coupling at each end of the reed pair 11 with, a pair of transverse members 16. The latter members 16 are also of a magnetically permeable material and serve to magnetically couple the contacting reeds 11 to a pair of parallelly disposed magnetic members 13 and 14. The members 13 and 14 are of a magnetic material exhibiting substantially rectangular hysteresis characteristics. It is apparent from FIG. 1 that three closed flux loops are presented in the ferreed structure so far described: One through each of the members 13 and 14 completed via the end members 16 and sharing the common path presented by the contacting reeds 11 and a third loop being completed in opposite directions through the parallel members 13 and 14 via the end members 16. During the operation of the ferreed device of FIG. 1, flux orientations and reversals in the members 13 and 14 are controlled by two sets of energizing winding sets 17 and 18 inductively coupled thereto. Specifically, the winding set 17 comprises a winding $a$ coupled to the member 14 and a winding $b$ coupled to the member 13. Similarly, the winding set 18 comprises a winding $a$ coupled to the member 13 and a winding $b$ coupled to the member 14. In each case the windings $a$ and $b$ are connected together in series opposition with the result that the windings $a$ and $b$ are coupled to the legs 13 and 14 in opposing senses. However, corresponding windings of the two winding sets 17 and 18 are coupled to the members 13 and 14 in the same sense for reasons and in a manner which will become more clear hereinafter. The windings $a$ of each member 13 and 14 have more turns than the associated windings $b$, a turns ratio of two having been found suitable in one embodiment of the ferreed switching device being described.

Closure of the contacts 19 of the contacting reeds 11 is accomplished in the following manner. A current pulse 17' is applied to the winding set 17 simultaneously with a current pulse 18' applied to the winding set 18. Although the pulses 17' and 18' are shown as positive in the drawing it will become apparent hereinafter that pulses of either polarity may be employed with the only condition imposed that they be the same for the two winding sets 17 and 18. In accordance with the sense of the winding $b$ of the winding set 17, the magnetomotive force generated thereby will tend to drive the member 13 to a direction of magnetization as indicated by the arrow $b'$. At the same time and in accordance with the sense of the winding $a$ of the winding set 17, the magnetomotive force generated by the latter winding will tend to drive the member 14 to a direction of magnetization as indicated by the arrow $a'$. Identical magnetic drives are applied to the members 13 and 14 as the result of the application of the current pulse 18'. The latter drives are represented on the members 13 and 14 by the arrows $a''$ and $b''$, respectively. However, since the number of turns of the windings $a$ of each of the members 13 and 14 is twice that of the windings $b$, the algebraic sum of the magnetomotive drives in each case is that indicated by the arrows $a'$ and $a''$, that is, upward as viewed in the drawing. The flux so induced in each of the members 13 and 14 closes through the loops including the end members 16 and contacting reeds 11. The latter reeds are, as a result, closed, this state being retained due to the remanent properties of the members 13 and 14. Had the current pulses 17' and 18' both been negative the resulting magnetomotive drives would have induced magnetizations in the members 13 and 14 in a direction opposite to that indicated by the arrows $a'$ and $a''$. However, the flux would still be closed through the contacting reeds 11 to effect this closure.

The contacts 19 are opened by reversing the flux in either one of the members 13 and 14. This may be accomplished by applying a current pulse 17' or 18' of either polarity, in this case positive, to either of the winding sets alone. Assuming a pulse 18' is applied to only the winding set 18, then a magnetomotive drive is applied to the member 13 in a direction as indicated by the arrow *a"* and in which direction the member 13 is already remanently magnetized. No change thus occurs in the member 13 except to drive it further into magnetic saturation. A magnetomotive drive as represented by the arrow *b"* however, is applied as the result of the current pulse 18', to the member 14. At this time no counteracting drive is being applied and, as a result, the magnetic flux in the member 14 is reversed. This switching flux is linked with and finds closure through, the flux in the member 13 thereby effectively bypassing the contacting reeds 11. The removal of the flux from the contacting reeds 11 in turn removes the magnetic attraction and permits the natural spring action of the reeds 11 to cause their separation. The same action occurs were a current pulse 17' to be applied to the winding set 17 alone, the flux reversal in this case appearing in the member 14. Were the switch already open, the condition of the members 13 and 14 would either remain the same or a complete flux reversal would be caused in the flux loop not including the contacting reeds 11 without affecting their operative state.

It will be apparent from the foregoing description of an illustrative operation of the ferreed device of FIG. 1 that the time coincidence of the current pulses 17' and 18' is of prime importance. Clearly, if current flows in windings 17 and 18 at different times, no flux will be driven through the contacting reeds 11 to cause their operation. Noncoincident current pulses will thus result in a failure of operation. However, current pulses which do in fact coincide at some time interval during their application but which also have nonoverlapping areas may not only fail to operate the contacts but may open the contacts of a relay which it is required to retain closed. This necessity of time coincidence of the operating current pulses of a differentially excited ferreed relay will be understood from a consideration of the embodiment of the invention depicted in FIG. 2.

In FIG. 2 is shown a coordinate ferreed switch matrix comprising a plurality of individual ferreed relays 20 arranged in rows *l*, *m*, *n* and columns *x*, *y*, *z*. The relays 20 are depicted, for purposes of simplicity, in the mirror symbol notation described by M. Karnaugh in "Pulse-Switching Circuits Using Magnetic Cores," vol. 43, Proceedings of the I.R.E., No. 5, page 570. As described in the foregoing, each of the relays 20 comprises a pair of magnetic members having substantially rectangular hysteresis characteristics, which members are represented in FIG. 2 by the verticals 21 and 22. The winding sets are shown as being serially connected in row and column energizing circuits 23 and 24, the individual windings and the sense of their coupling being represented by the diagonal lines in accordance with mirror symbol representations. The illustrative turns ratio of 2 is further represented by the double diagonal lines at each magnetic member symbol 21 and 22. Each of the switches 20 further comprises a pair of flux responsive contacting reeds enclosed in an envelope 25. The contacting reeds are connected between row and column electrical conductors 26 and 27, respectively, which conductors are advantageously transmission paths of the electrical circuits, not shown, which the matrix switch of this invention is adapted to control.

In accordance with an essential aspect of this invention, each of the row and column energizing circuits 23 and 24 is connected at one end to a common conducting bus 30. Each of the column energizing circuits is connected at the other end to a column selecting switch 31 which may comprise any suitable switch known in the art capable of selectively providing current pulses of the character to be described. Since such switches are well known in the art the switch 31 is shown only in block symbol form. Each of the row energizing circuits 23 is connected at the other end to a row selecting switch 32. The latter switch may comprise any suitable switch well known in the art capable of selectively completing paths to ground or other difference potential for the current pulses supplied by the switch 31. It is apparent from the foregoing description that a permanently connected path exists via each row and column energizing circuit 23 and 24 and the common conducting bus 30 between the selecting switch 31 and the selecting switch 32.

In describing an illustrative operation of the embodiment of this invention depicted in FIG. 2 it will be assumed that the ferreed relay 20' at the crosspoint defined by the row and column *my* is to be operated in order to complete a connection between the row and column conductors 26' and 27'. It will further be assumed that the relay 20' was previously in an unoperated state, that is, with its contacts open, and its magnetic members 21' and 22' remanently magnetized as indicated by the adjoining arrows. In accordance with the sense of the windings of the relay 20', a positive going current pulse is applied to the column energizing circuit 24' by the switch 31 simultaneously with closing of a path to ground by the switch 32 at the row energizing circuit 23' to select the crosspoint relay 20'. The current pulse 33 is simultaneously applied to a single winding set of each of the relays 20 appearing along the energizing circuit 24' in addition to the windings of relay 20'. Accordingly, in each of these relays 20, the contacting reeds are opened. The current pulse 33 is transmitted to the row energizing circuit 23' by the common conducting bus 30 and at the relay 20' the same current pulse 33 in the two winding sets causes a flux switching in the left hand magnetic member 21'. The flux in the right hand member 22' is maintained in the direction previously obtaining by the predominating magnetomotive drive generated by the winding having the greater number of turns in the energizing circuit 23'. The fluxes in the members 21' and 22' are closed through the common path presented by the contacting reeds to achieve closure of the contacts. Since each of the other relays 20 appearing along the energizing circuit 23' will have the current pulse 33 conducted only to one of the winding sets, the latter relays will also be opened.

Obviously the coincidence of operation of the selecting switches 31 and 32 is not critical with respect to the coincidence of currents in the two winding sets of the selected crosspoint relay 20'. Only sufficient coincidence of operation of the switches 31 and 32 is required to insure that the pulse 33 is adequate to perform the flux switching in a magnetic member 21 or 22. The advantageous object of this invention is thus achieved that a current pulse 33 will appear in one winding set of a selected crosspoint relay 20 only at the precise time that it also appears in the other winding set. No opportunity is thus afforded to leave a selected relay open due to failure of tracking coincidence of the two current excitations in the winding sets. Although the current pulse 33 is shown in idealized form as being square, this pulse may be of any waveform which may conveniently be generated as long as it presents sufficient area during the period of its application to cause the required flux switchings in the magnetic members 21 and 22 of the relays of the matrix of FIG. 2. It will further be apparent that, although the current pulse 33 was assumed to be positive, a current of the opposite polarity would also have operated the contacting reeds of the selected crosspoint relay 20'. In this case the only difference of operation would be that the magnetic member 22' of the relay 20' instead of the member 21' would have had the remanent flux therein reversed.

Release of the selected crosspoint relay 20' is accomplished during a subsequent selection of a cross point relay 20 defined by a row or column energizing circuit 23 or 24 also defining the operated crosspoint relay 20'. At such a time only one of the winding sets of the operated relay 20' will be energized and its contacting reeds opened as described in detail in the foregoing.

What has been described is considered to be only an illustrative embodiment of the principles of this invention. Accordingly, it is to be understood that various other arrangements may be devised by one skilled in the art without departing from the spirit and scope of this invention.

What is claimed is:

1. An electrical switching matrix comprising a coordinate array of electrical switches each comprising a pair of flux responsive electrical contacting reeds, a pair of magnetic members each having substantially rectangular hysteresis characteristics, a first and a second winding on each of said magnetic members, said first winding having a greater number of turns and being coupled in the opposite sense than said second winding, and magnetic means for completing flux paths between said magnetic members and said contacting reeds; a first plurality of circuit means for serially connecting the first winding of said magnetic member and the second winding of the other magnetic member of each of the switches in first coordinates of said array, a second plurality of circuit means for serially connecting the second winding of said one magnetic member and the first winding of said other magnetic member of each of the switches in second coordinates of said array, and means for applying the same current pulse to the first and second windings of both said magnetic members of a selected switch of said array comprising a plurality of selecting circuits including respectively said first and said second plurality of circuit means, means for selectively applying a first potential to one end of one of said first plurality of circuit means, means for selectively applying a second potential to one end of one of said second plurality of circuit means simultaneously with said first potential, and a common conducting bus connected to the other end of each of said first and said second plurality of circuit means.

2. An electrical switching matrix comprising a coordinate array of electrical switches each comprising a pair of flux responsive electrical contacting reeds, a pair of magnetic members each having substantially rectangular hysteresis characteristics, a first and a second winding on each of said magnetic members, said first winding having a greater number of turns and being coupled in the opposite sense than said second winding, and magnetic means for completing flux paths between said magnetic members and said contacting reeds; means for permanently connecting said first and second winding of one magnetic member of each of said switches in series with said first and second winding of the other magnetic member comprising a plurality of first circuit means for serially connecting the first and second windings of one magnetic member of each of the switches in first coordinates of said array, a plurality of second circuit means for serially connecting the first and second windings of the other magnetic member of each of the switches in second coordinates of said array, and a common conducting bus connected to one end of said plurality of first and second circuit means; means for applying a current pulse to the other end of a selected circuit of said plurality of first circuit means, and means for completing a circuit for said current pulse in a selected circuit of said plurality of second circuit means.

3. An electrical switching matrix comprising a plurality of differentially excited ferreed switches arranged in rows and columns, each having a first and a second winding set associated therewith, first circuit means for connecting the first winding sets of the switches of said rows in series, second circuit means for connecting the second winding sets of the switches of said columns in series, means for applying the same current pulse to both winding sets of a selected ferreed switch comprising a source of current pulses connected to one end of the second circuit means of the column including said selected ferreed switch, a common conducting bus connected to the other end of said last-mentioned second circuit means and one end of the first circuit means of the row including said selected ferreed switch, and means connected to said last-mentioned first circuit means for completing a circuit for said current pulse.

4. In an electrical switching matrix comprising a plurality of differentially excited ferreed switches arranged in rows and columns, each having a first and a second winding set associated therewith, in combination, selecting means for selecting a particular one of said plurality of ferreed switches comprising a row energizing circuit including the first winding set of said particular one of said ferreed switches, a column energizing circuit including the second winding set of said particular one of said ferreed switches, and means for applying the same current pulse simultaneously to both said first and second winding set of said particular one of said ferreed switches comprising a pulse source connected to one end of said column energizing circuit, a common conducting bus connected to the other end of said column energizing circuit and to one end of said row energizing circuit, and means in said row energizing circuit for completing a circuit for said current pulse.

5. An electrical switching matrix comprising a coordinate array of electrical switches each comprising a pair of flux responsive electrical contacting reeds, a pair of magnetic members each having substantially rectangular hysteresis characteristics, first and second oppositely wound windings on each of said magnetic members, said first winding having a greater number of turns than said second winding, the first winding of each of said magnetic members being connected to the second winding of the other magnetic member in a pair of energizing winding sets, and magnetic means for completing flux paths between said magnetic members and said contacting reeds; a first plurality of circuit means for serially connecting one of the winding sets of each of the switches in first coordinates of said array, a second plurality of circuit means for serially connecting the other of the winding sets of each of the switches in second coordinates of said array, each of said first and said second plurality of circuit means being connected at one end to a common electrical conductor, means for applying a current pulse to a selected one of said first plurality of circuit means, and means in a selected one of said second plurality of circuit means for completing a circuit for said current pulse.

6. An electrical switching matrix comprising a plurality of ferreed switches arranged in rows and columns, each of said switches having a first and a second winding set associated therewith and being operated responsive to the equal and simultaneous energization of said first and second winding sets and being released responsive to the energization of only one but not both of said first and second winding sets, first circuit means for connecting the first winding sets of the switches of said rows in series, second circuit means for connecting the second winding sets of the switches of said columns in series, and means for releasing each of the switches in a selected row and in a selected column of said matrix and for operating a selected switch defined by said selected row and selected column comprising means including a pulse source for applying a current pulse to one end of the second circuit means of said selected column, a common conducting bus connected to the other end of said last-mentioned second circuit means and to one end of the first circuit means of said selected row, and means connected to the last-mentioned first circuit means for completing a circuit for said current pulse.

7. In combination, in an electrical switching matrix comprising a plurality of ferreed switches arranged in rows and columns, each of said switches having a first and a second winding set associated therewith and being operated responsive to equal and simultaneous current pulses in said first and second winding sets and being released responsive to a current pulse in only one but not both of said first and second winding sets, means for simultaneously releasing each of the switches of a selected row and a selected column of said matrix and for operating a selected switch defined by said selected row and column comprising first circuit means for serially connecting the first winding sets of the switches of said selected column, second circuit means for serially connecting the second winding sets of the switches of said selected row, conducting means connecting one end of said first and said second circuit means, means including a pulse source for applying a current pulse to the other end of said first circuit means, and means connected to the other end of said second circuit means for completing a circuit for said current pulse.

No references cited.